(12) United States Patent
Meyer

(10) Patent No.: US 7,137,917 B2
(45) Date of Patent: Nov. 21, 2006

(54) TRANSPORT TOOTH CHAIN WITH REDUCED WEAR ON THE VERTICAL DIMENSION OF ITS LINK MEMBERS

(75) Inventor: Thorsten Meyer, Laatzen (DE)

(73) Assignee: Rexroth Mecman GmbH, Hannover (DE)

( * ) Notice: Subject to any disclaimer, the term of this patent is extended or adjusted under 35 U.S.C. 154(b) by 364 days.

(21) Appl. No.: 10/635,220

(22) Filed: Aug. 6, 2003

(65) Prior Publication Data

US 2004/0138020 A1 Jul. 15, 2004

(30) Foreign Application Priority Data

Aug. 9, 2002 (DE) ................. 102 36 705

(51) Int. Cl.
  *F16G 1/28* (2006.01)
(52) U.S. Cl. ...................... 474/213; 198/850
(58) Field of Classification Search ............... 474/202, 474/206, 212, 213; 198/834, 850, 851
  See application file for complete search history.

(56) References Cited

U.S. PATENT DOCUMENTS

| 2,653,485 A | 9/1953 | Mac Arthur | |
|---|---|---|---|
| 4,925,016 A | * 5/1990 | Lapeyre | 198/834 |
| 5,156,262 A | * 10/1992 | Horton | 198/834 |
| 5,706,934 A | * 1/1998 | Palmaer et al. | 198/853 |
| RE38,607 E | * 10/2004 | Guldenfels et al. | 198/834 |

FOREIGN PATENT DOCUMENTS

| AU | 495 420 | 9/1976 |
|---|---|---|
| DE | 198 44 304 C1 | 3/2000 |
| DE | 199 44 973 | 4/2001 |
| GB | 2 108 456 A | 5/1983 |
| JP | 11-72145 | 3/1999 |
| WO | WO 01/92758 | 12/2001 |

* cited by examiner

*Primary Examiner*—Vicky A. Johnson
(74) *Attorney, Agent, or Firm*—Henry M. Feiereisen

(57) ABSTRACT

Tooth-shaped link member (1) for a transport tooth chain (11) with apertures (2) and two end-terminal toes (3) for the form-fitting engagement with a gear 99), which is geometrically adapted to the configuration of the gear (9), and which in addition each exhibit a lower contact surface (6) for gliding on a gliding surface of a guide body (8), wherein as an additional means for reducing the wear on the link member (1) a third gliding toe (4) is provided with does not come in form-fitting contact with the gear (9) which is arranged centrally between the end-terminal toes (2) of the link member 91) in order to enlarge the total surface of the link member on the gliding surface (7).

7 Claims, 5 Drawing Sheets

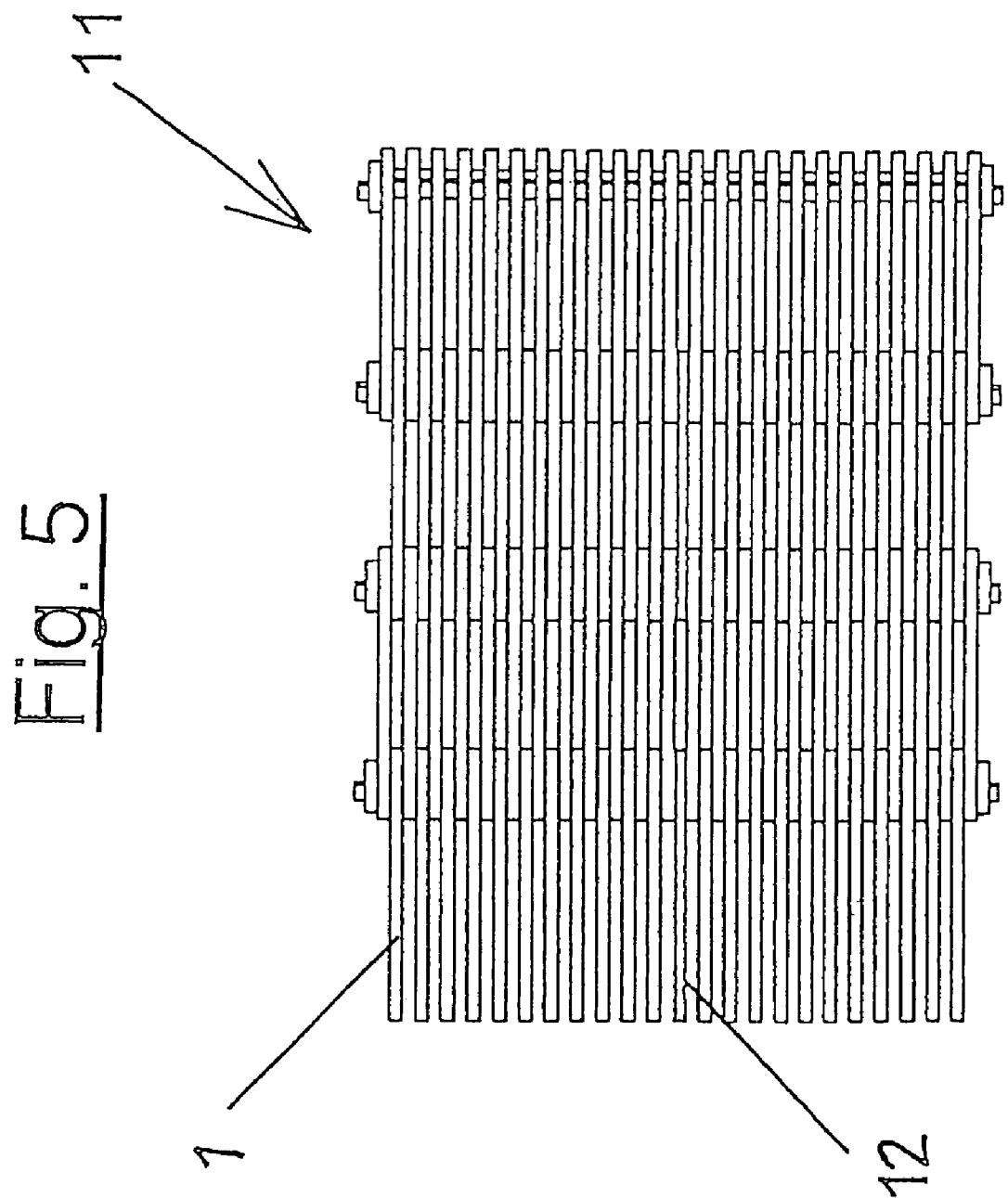

TRANSPORT TOOTH CHAIN WITH REDUCED WEAR ON THE VERTICAL DIMENSION OF ITS LINK MEMBERS

CROSS-REFERENCES TO RELATED APPLICATIONS

This application claims the priority of German Patent Application, Ser. No. 102 36 705.1-12, filed Aug. 9, 2002, pursuant to 35 U.S.C. 119(a)–(d).

BACKGROUND OF THE INVENTION

The invention refers to a tooth shaped link member of a tooth chain with apertures and two end terminal toes for form-fitting engagement with a toothed gear and having an outer contour corresponding to the toothed gear, and wherein the toes are provided with a contact surface for gliding on a gliding surface of a guide body. Furthermore, the invention refers to a transport tooth chain comprising a plurality of these link members and a transport conveyer comprising at least a plurality of these transport tooth chains.

These types of link members, transport tooth chains and transport conveyors are normally utilized in the conveying industry. Thus, for the formation of a linear conveying line with a transport conveyor which is according to a type of conveyor belt, transport tooth chains comprised of links are guided in an endless manner across an elongated conveying device with end terminal diverting—and/or driving rollers. Thereby, at least the driving roller which is configured as a toothed gear engages with the corresponding toes of the link member, respectively the tooth chain. An arrangement of this type is normally operated in environments where high temperatures exist—such as for example during production of hollow glass bodies. These parts of the tooth chain, which are manufactured entirely from steel, reliably withstand the very high temperatures that are generated during such work operations.

A tooth chain of the type referred to is known from DE 198 44 304 C1. The transport tooth chain consists of single link members linked to each other by means of round bolts or by cradle-type joints. A cradle-type joint consists of two parts as compared to a round bolt, namely a cradle pin and a support pin. The support pin is riveted end-terminally with a rivet washer in order to hold the link members together. Both profile pins are held in the apertures of the link member. During movement of the joint, both profile pins are rolling off each other. Thus, as compared to a pin support, no sliding friction occurs in the joint, thereby drastically reducing wear in that area.

In contrast thereto, chain conveyors that do not incorporate similar supplementary parts are also generally known in the prior art. In such conveyors, the tooth chain is conducted within a guiding device formed in the elongated support device similar to a type of gliding bed. The guiding device consists normally of a bottom portion laterally flanked with adjacent vertically extending wall portions. The width of the guiding device is dimensioned in such a manner that the tooth chain is guided therein with little lateral play.

All of the afore-discussed types of tooth chains suffer from the drawback, that the wear on the tooth shaped driving links are very heavy due to the gliding friction between the toes of the link and the guiding device. Optimization of the wear areas has been tried in order to realize a longer serviceable life.

For example, it has been tried to receive the arrangement of the bolts, which extend beyond the outer link members of the tooth chain in a recess in the sidewall of the guiding device, so that the sidewall area can operatively engage directly with the outer link member of the tooth chain.

There were also attempts to reduce the wear on the link members, more precisely the gliding surface of the toes of the link member. Accordingly, the link members were configured shorter, whereby the contact surface was enlarged which reduced the surface pressure between the contact surface and the gliding surface. This configuration leads inevitably too more building parts and to a change in the geometry of the gearing as well as to the division thereof.

SUMMARY OF THE INVENTION

It is thus an object of the present invention, to further improve a tooth shaped link member, a transport tooth gear chain and a transport conveyer of the afore-described type in such a manner that the tendency of wearing during the gliding movement across the guide body is kept at a minimum, that the number of building parts are kept at least constant and the changes to the drive rollers and/or diverting rollers are kept at a minimum.

This object is realized starting with a tooth shaped link member for a transport tooth chain with apertures and two end-terminal toes for formfitting engagement with a gear and which are geometrically corresponding to the configuration of the gear, additionally exhibit at the lower end a contact surface for gliding on a glide surface of a guide body, wherein as additional means for reducing wear on the contact surface of the toes, a third gliding toe is provided which is not in formfitting engagement with the gear and which is arranged centrally between the two end-terminal toes of the link member in order to enlarge the total contact surface of the link member on the gliding surface.

The invention comprises the technical teaching, that the tooth shaped link member is provided with additional means in order to reduce wear on the toes of the link member by increasing the total contact surface of the toes in a manner so as not to impinge on the operative engagement of the link members with the gears. The means for reducing wear on the toes that increases the contact surface of the link member is realized by arranging a third toe located centrally between the two end terminal toes. In this manner the contact surface can be distinctly increased. During operation, while the end-terminal toes are engaging the gears, this gliding toe, due to its arrangement, does not engage the gears, that is, it does not come in contact with the gears. This solution offers the advantage that the pre-existing geometries, in particular that of the driving and/or diverting rollers need not be changed, the number of links need not be increased, while at the same time wear on the contact surface of the toes is considerably reduced.

One of the improving features of the present invention provides that the third, that is, the central toe of the link member has essentially the same contact surface as the two end terminal toes. In that simple manner, the contact surface is increased by about 50%; whereby wear is reduce by about 33%.

A further improving feature of the present invention provides that the third, central gliding toe of the link member is formed together with the two engaging toes as unitary stamped piece from metal sheet. Due to the unitary configuration of the gliding toe, the link member according to the invention can be mass produced by means of simple stamping thereby avoiding any increase in the number of building parts.

A further improvement is that the geometry of the gliding toe is shaped essentially trapezoidal, so that during operation, the gliding toe does not come in contact with the gears. In this manner, a stable gliding toe can be formed with a large gliding surface, which will fit in between the free space of the toothed portion of a driving gear or a diverting gear, without contacting the toothed portion of the gear.

Preferably, the geometry of the toes corresponds to a standardized geometric configuration comprising the geometries of involutes gear teeth, linear gearing, cycloid gearing or pin wheel gearing.

The transport tooth chain according to the present invention consists of an endless chain of tooth shaped link members according to the invention. Accordingly, the chain conveyor comprises the transport tooth chain according to the invention conducted endlessly over a drive wheel arrangement, which in operative engagement with the tooth shaped link members of the tooth chain and lead across a guiding body representing the transport track.

Further features, which serve to improve the invention, are recited in the dependent claims or are more closely illustrated together with the description of a preferred embodiment of the invention in the Figures, as follows:

BRIEF DESCRIPTION OF THE DRAWING

FIG. 5 is a top view of a detail showing the transport tooth chain according to FIG. 4.

DETAILED DESCRIPTION OF PREFERRED EMBODIMENTS

Figure 1:
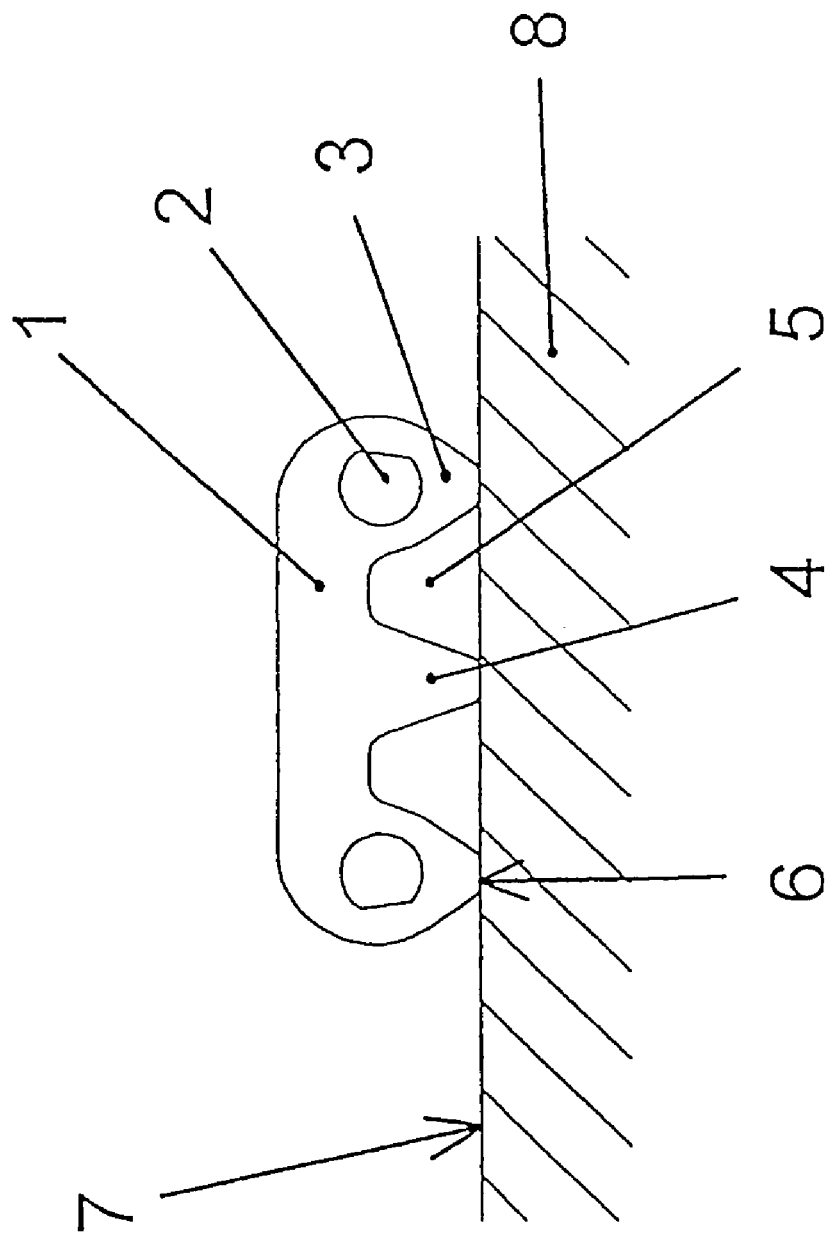
FIG. 1 is a side view of the tooth shaped link member according to the present invention.

The tooth shaped link member 1 according to FIG. 1 comprises two apertures 2 and two end-terminal toes 3 as well as the additional wear-reducing feature in the form of a gliding toe 4. The two toes 3 each delimit the link member 1 in longitudinal direction. The toes 3 are provided with apertures 2. Linking several link members into a transport tooth chain is realized by disposition of plug-in connections within the apertures, not shown here in detail. The third toe is arranged centrally between the two engagement toes 3. Between the central gliding toe 4 and each of the two end-terminal toes 3 a free space 5 is formed in which the gearing of a gear with corresponding geometry—not shown here—can engage. The tooth shaped link member 1 incorporating the third toe is formed as a unitary piece, so that the link member possesses a three-toe outer contour. Die geometry of the third central gliding toe 4 essentially of trapezoidal configuration. All three toes exhibit at their distal end a contact surface 6 which can glide across a gliding surface 7 of a guide body 8. The contact surfaces 6 of all toes have the same dimension.

Figure 2:
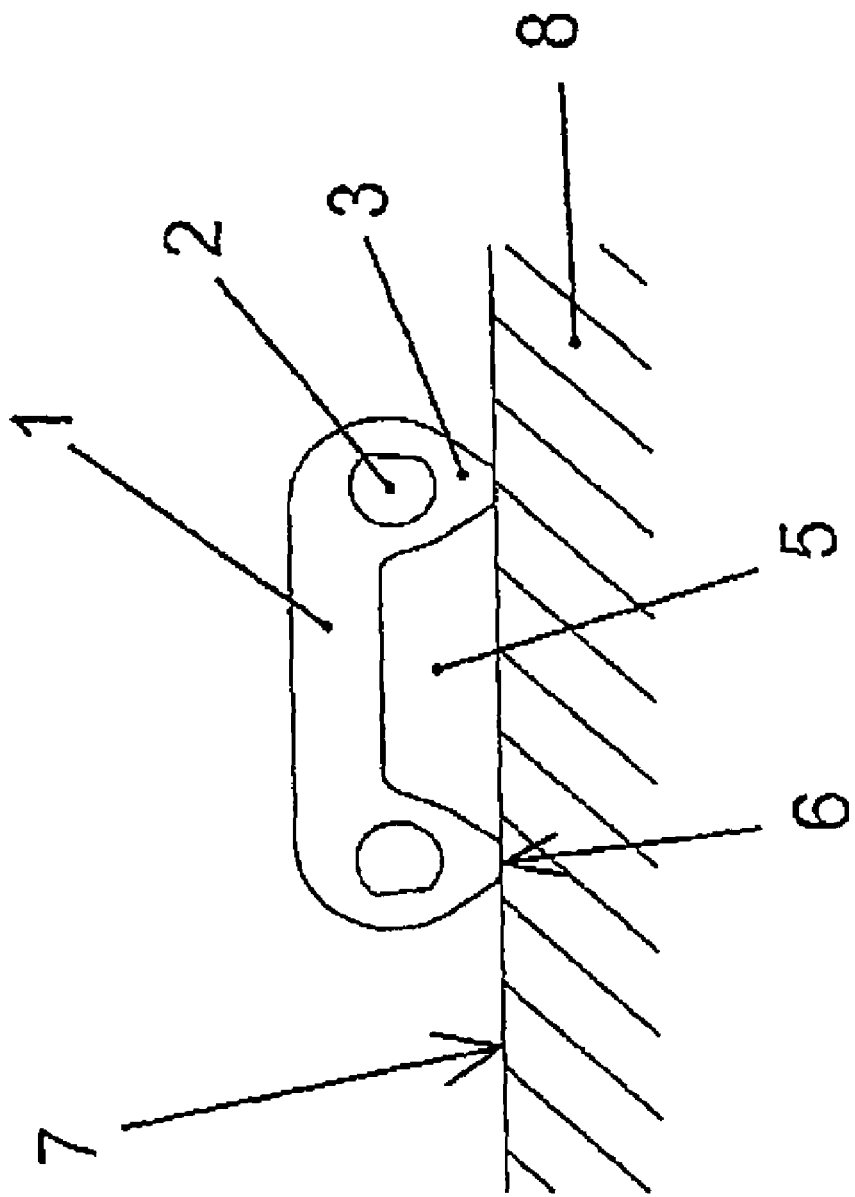
FIG. 2 is tooth shaped link member of the prior art.

In FIG. 2 a corresponding tooth shaped link member 1 of the prior art is shown for comparison. This link member shows two toes 3 each provided with an aperture and bordering the longitudinal extension of the link. The two toes 3 are gliding with contact surface 6 across the contact surface 7 of guide body 8. Between the two toes 3 exists a large free space 5 designed to avoid impact of an engaging gear—not shown here—with a transport tooth chain consisting of one or more link members 1.

Figure 3:
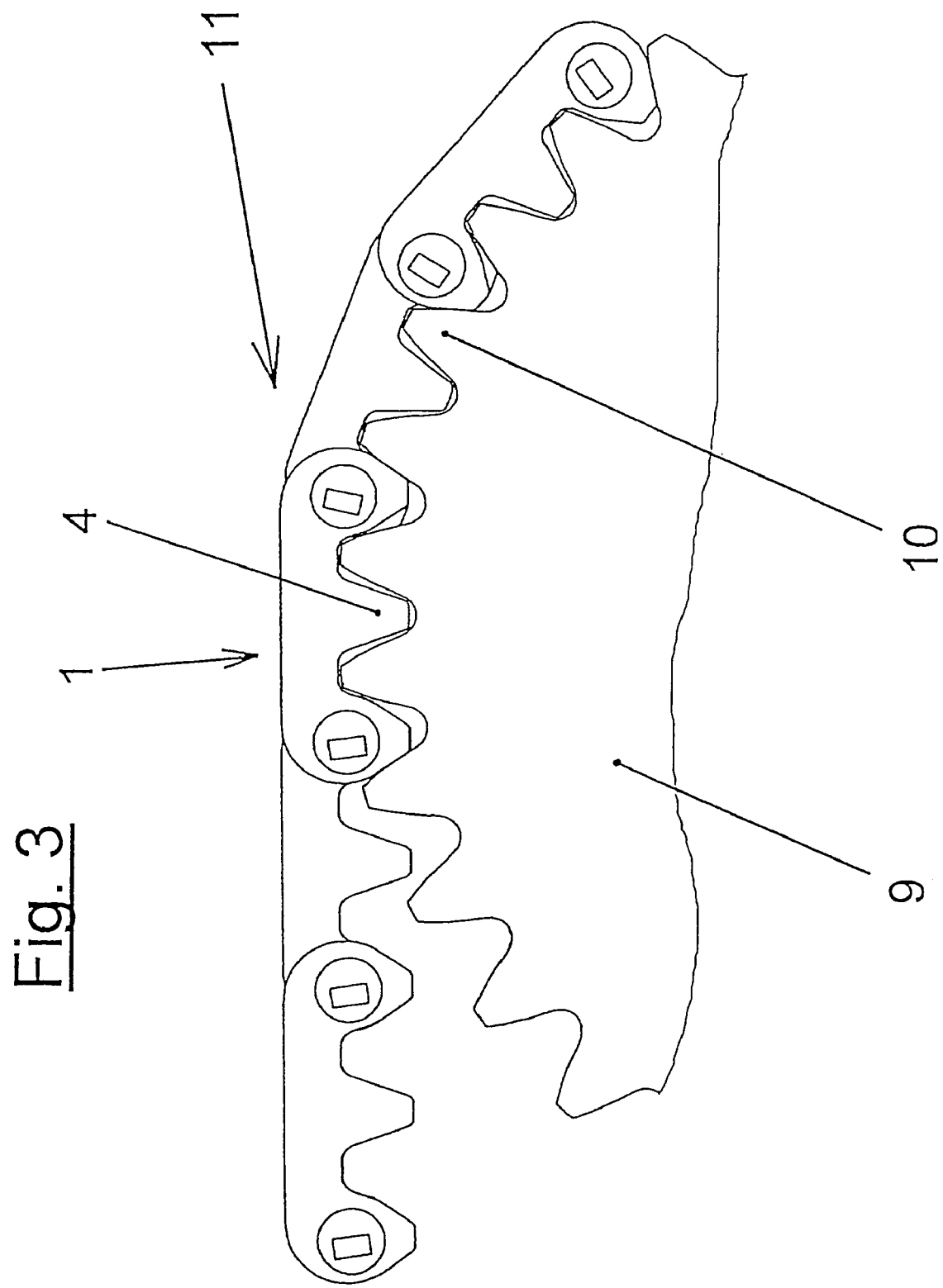
FIG. 3 is a detail of the transport tooth chain according to the present invention in engagement with a gear.

In FIG. 3, several link members 1 according to the invention are linked into an endless transport tooth chain. As shown here, the toes 10 engage a gear 9 with the free space between the toes of the link member 1. The third, central toe of link member 1 does not contact gear 9, respectively the tooth portion 10 of gear 9.

Figure 4:
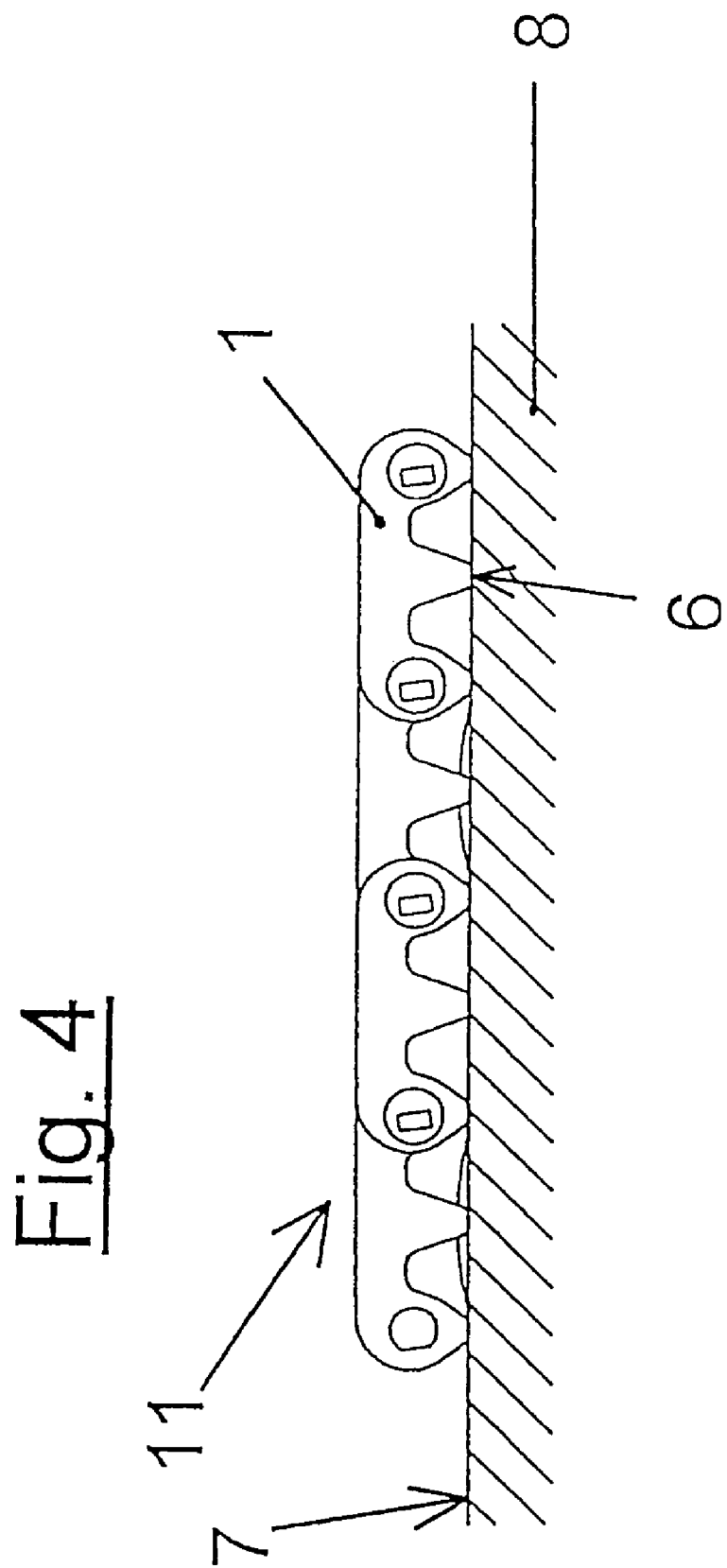
FIG. 4 is s a detail of the transport tooth chain according to the present invention, which is gliding on a guide body.

FIG. 4 shows a detail of a transport tooth chain 11 according to the present invention showing 4 toes according to the invention on a guide body 8. Each of the link members contacts the gliding surface 7 of the guide body 8 with a contact surface 6.

FIG. 5 shows a top view from a detail of the transport tooth chain 11 according to the invention. Each of the link members 1 of the transport tooth chain according to the invention are linked in succession as well as also side by side with each other by means of the afore-described plug-in connection. By varying the number of adjacent links links 1, a contact surfaces of different width for transporting goods are realized. For example, two guide links 12 which are arranged in immediate succession are marked in dark. The guide links 12 which are known per se run in the guide grooves—not shown here—of the gears and conduct the tooth chain conveying direction.

The invention claimed is:

1. A tooth shaped link member for a transport tooth chain, comprising an apertured link body having a lower contact surface for gliding on a guide surface, said link body having two outer toes configured for formfitting engagement with a gear and one further gliding toe having a configuration to engage the gear substantially without contact and arranged centrally between the two outer toes to enlarge the contact surface of the link body on the guide surface and thereby reduce wear of the contact surface of the link body.

2. The link member of claim 1, wherein the gliding toe and the outer toes are each dimensioned to form part of the contact surface, wherein the part of the contact surface of the gliding toe and the part of the contact surface of the outer toes substantially correspond to one another.

3. The link member of claim 1, wherein the gliding toe forms with the outer toes a single-piece punched metal sheet.

4. The link member of claim 1, wherein the gliding toe has a geometric configuration of substantially trapezoidal shape and is configured to be out-of-contact, when the link body engages the gear.

5. The link member of claim 1, wherein the outer toes have a geometric configuration which corresponds to a standard tooth geometry selected from the group consisting of geometry of an involute, straight gearing, cycloid gearing, and pin wheel gearing.

6. A transport tooth chain, comprising a plurality of link members interconnected to one another to form and endless chain, each of the link members having a lower contact surface for gliding on a guide surface and including two outer toes configured for formfitting engagement with a gear and one further gliding toe having a configuration to engage the gear substantially without contact and arranged centrally between the two outer toes to enlarge the contact surface of the link body on the guide surface and thereby reduce wear of the contact surface of the link body.

7. A chain conveyor, comprising:
  at least one transport tooth chain according to claim 6;
  a driving sprocket in driving engagement with the transport tooth chain; and
  a guide body for guiding the transport tooth chain longitudinally along a transport route.

* * * * *

UNITED STATES PATENT AND TRADEMARK OFFICE
CERTIFICATE OF CORRECTION

PATENT NO.        : 7,137,917 B2
APPLICATION NO.   : 10/635220
DATED             : November 21, 2006
INVENTOR(S)       : Thorsten Meyer It is certified that error appears in the above-identified patent and that said Letters Patent is hereby corrected as shown below:

Column 4, Line 29:    Change "engage the gear substantially" to

--interact with the gear--

Column 4, line 54:    Change "engage the gear substantially" to

--interact with the gear--

Signed and Sealed this

Twenty-third Day of January, 2007

JON W. DUDAS
*Director of the United States Patent and Trademark Office*